United States Patent [19]
Wanger

[11] 3,776,270
[45] Dec. 4, 1973

[54] FLUID COUPLING FOR THE TRANSMISSION OF CONTROL SIGNALS

[75] Inventor: Freddy Wanger, Baden, Switzerland

[73] Assignee: Heberlein & Co., AG, Wattwil, Switzerland

[22] Filed: July 19, 1971

[21] Appl. No.: 163,740

[30] Foreign Application Priority Data
Aug. 17, 1970 Switzerland.................... 12314/70

[52] U.S. Cl. .............................................. 137/580
[51] Int. Cl. ............................................ F16l 27/00
[58] Field of Search .................... 137/625.11, 580; 68/150

[56] References Cited
UNITED STATES PATENTS
2,308,137 1/1943 White .............................. 137/580
3,381,704 5/1968 Richardson ...................... 137/580 X
3,643,477 2/1972 Lorenz ............................. 68/150

Primary Examiner—William R. Cline
Attorney—Joseph M. Fitzpatrick et al.

[57] ABSTRACT

Fluid coupling including a hollow stator and cylindrical rotor within same and having at least one longitudinally extending pipe for conveying fluid to device to be actuated, the stator having at least one chamber adapted to register with an opening in the rotor in a particular relative rotational position of the rotor and stator to effect fluid communication between the pipe and the device to be actuated.

4 Claims, 3 Drawing Figures

PATENTED DEC 4 1973

INVENTOR.
FREDDY WANGER

BY
Fitzpatrick Cella Harper & Scinto
ATTORNEYS

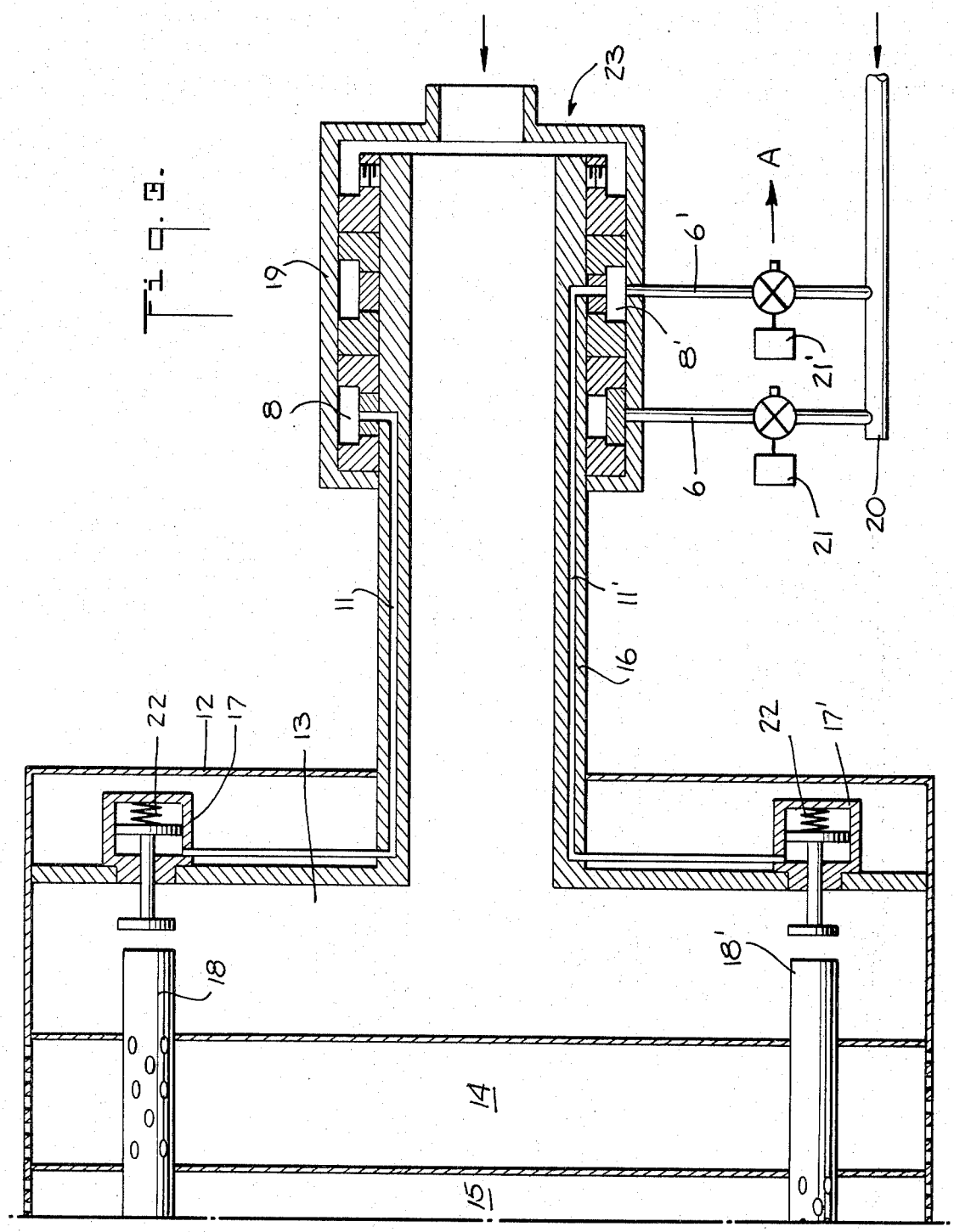

FLUID COUPLING FOR THE TRANSMISSION OF CONTROL SIGNALS

The present invention relates to control apparatus, and more particularly to apparatus for the transmission of control signals by means of a fluid control medium such as liquid or gas.

Apparatus according to the present invention is useful for signal control in a variety of applications wherein the signals must be transmitted from a stationary point to or through a rotating member, or vice versa.

The apparatus of the present invention is characterized in that it comprises a hollow cylindrical static part or stator and a coaxial, cylindrical rotating part or rotor arranged in the cavity of the stator. The stator includes at least one coaxial, annular chamber into which at least one pipe for the control medium extends, and which is formed with an annular groove directed towards the rotor and within which a counter-ring mounted on the rotor and secured thereon against rotation is engaged. The counter-ring is formed with at least one radial bore which is in fluid flow communication with a bore or pipe extending longitudinally in the rotor.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein:

FIG. 3 is a central longitudinal sectional view through apparatus illustrating an application of the invention.

Figure 1:
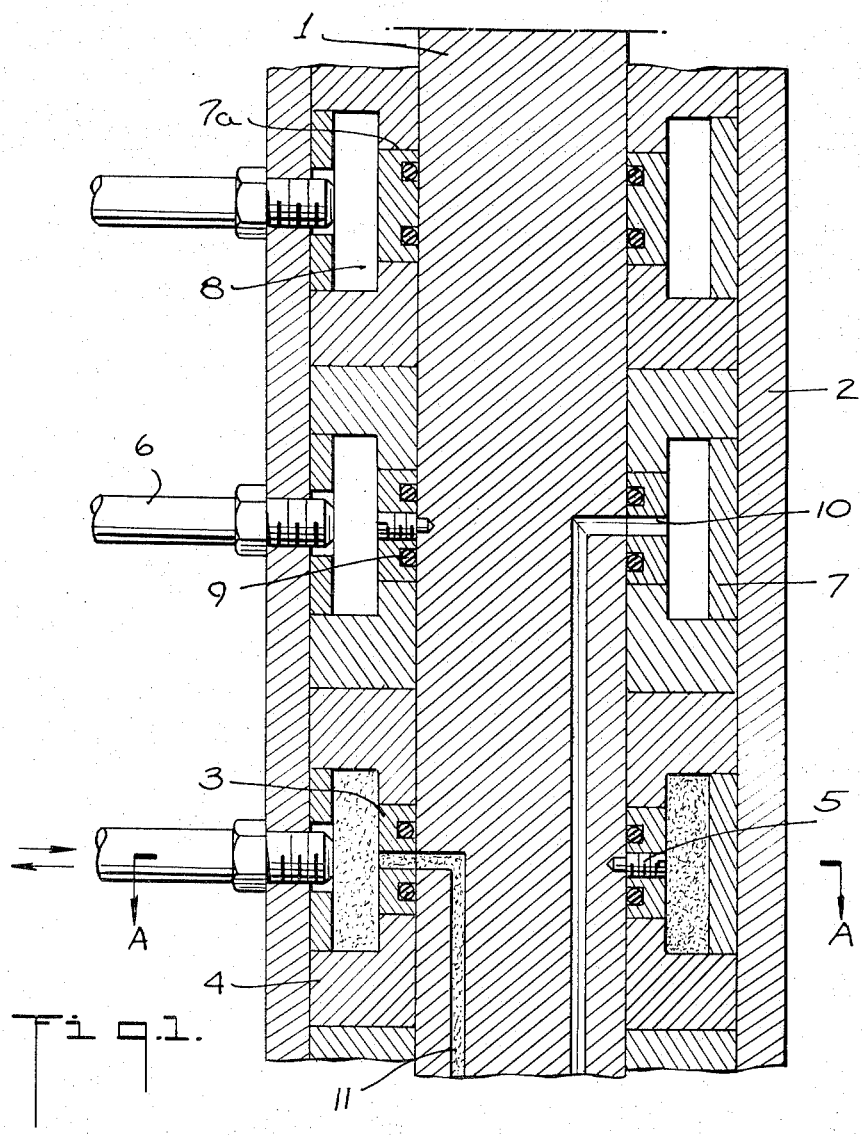
FIG. 1 is a central longitudinal section through an embodiment of the apparatus of the present invention.
Figure 2:
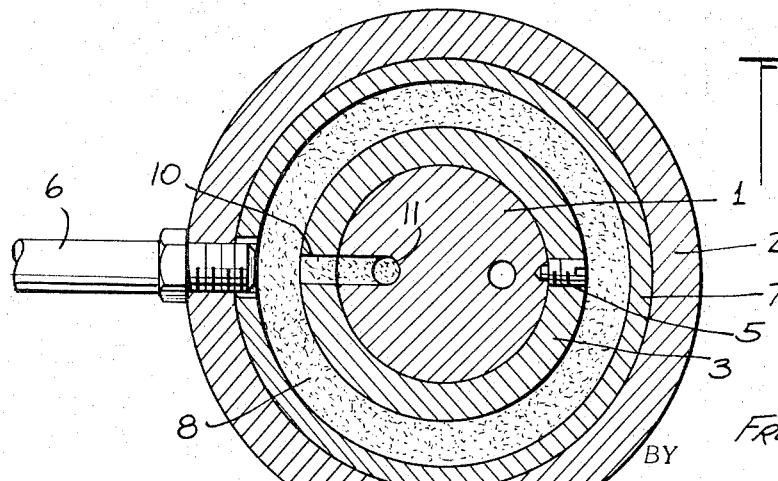
FIG. 2 is a cross-sectional view taken along the lines A—A of FIG. 1.

In FIGS. 1 and 2, a circular tubular static part or stator 2 is shown within which coaxially extends a rotating cylinder or rotor 1. The inner wall of the stator 2 is provided at regular axial distances with pairs of slide-ring packings 4 and spacers 7 disposed to define chambers 8 for receiving the control medium. The stator 2 and the spacers 7 are formed with corresponding bores, i.e., bores in registry with the chambers, through which tubes 6 for the control medium are passed. Each pair of slide-ring packings 4 delimiting a chamber 8 also form an annular groove 7a in which a counter-ring 3 closely surrounding the cylinder 1 is positioned in tight contact with the rotor by means of packings 9. Each counter-ring 3 is secured against rotation on the cylinder 1 by means of a screw 5, and has a radial bore 10 which is connected with a corresponding axially parallel pipe 11 for the control medium. The bores 10 and pipe 11 are annularly staggered in the rotor 1 so that any number may be employed, limited only by the size of the apparatus.

The control signals may be transferred to control or positioning members (not shown) by means of a fluid medium such as gas or liquid through pipes 6 passing through the stator 2, and communicating via the chambers 8 and the bores 10 with the pipes 11 of the rotor 1. It is, however, also possible to transfer control signals in the reverse direction, i.e., from the rotating part 1 via the static part to control or positioning members located downstream the latter. Various pipes leading to different control members may also be connected with each chamber of the stator.

FIG. 3 shows an application of the apparatus of the invention to full width treatment equipment for textile material, comprising a drum rotatable around its axis. In this application of the invention, the feeding of the fluid treatment medium into various chambers of the drum is controlled by apparatus according to my invention. In this connection, attention is invited to copending application Ser. No. 817,344 now U.S. Pat. No. 3,643,477.

In FIG. 3, numeral 12 designates the drum which has an antechamber 13 and various treatment chambers, only the treatment chambers 14 and 15 being shown. The treatment medium is introduced into the antechamber 13 through the hollow shaft journal 16 and through the tubes 18, 18', which may be opened and closed by means of valves 17, 17', and thence into the chambers. The tubes are perforated within the chambers 14, 15 to be provided with the treatment medium.

The hollow drum shaft journal 16 forms the rotating part or rotor of the apparatus of the present invention, and the numeral 19 refers to the stator, both of these parts having been described in connection with FIGS. 1 and 2. The stator is assembled with a packing head 23 and the introduction of the control medium is effected through pressure pipe 20 from where it is fed to the pressure chambers 8, 8' through the individual pipes 6, 6', in which three-way valves 21, 21' are arranged, and from there to the valves 17, 17' via the pipes 11, 11', which are thereby opened so that the treatment medium can penetrate into the tubes 18. Further tubes of the rotor may be connected with respective chambers 8, 8' for conducting the control medium and may also actuate further valves for opening and closing tubes and for simultaneously feeding drum chambers with treatment mediums. Applying a programmed control, the valves 21 are actuated electromagnetically or pneumatically. When switching the valves 21, 21' to closed position, the springs 22, 22' close the valves 17, 17', the control medium being pressed back into the valves 21, 21' and flowing back in direction of arrow A.

I believe that the construction and operation of my novel invention will now be understood and that my contribution will be fully appreciated by those persons skilled in the art.

I claim:

1. Apparatus for transmitting control signals by means of fluid medium comprising, a hollow cylindrical stator (2) and a cylindrical rotor (1) extending coaxially within said stator, the inner wall of the stator being provided with packing means (4) and spacers (7) disposed to define sealed annular chambers (8) spaced axially and uniformly along said stator, each chamber being in registry with an opening in the stator, into each of which a pipe (6) for the control medium is introduced from the exterior, each said chamber having a part opening toward said rotor, a counter-ring (3) secured against rotation relatively to said rotor and being positioned in each chamber and engaged in sealing contact with said rotor, at least one axial conduit (11, 11') in said rotor leading to members to be actuated by the medium, each counter-ring having at least one bore (10) connected with said axial conduit adapted to effect communication between one of said conduits and one of said chambers.

2. Apparatus according to claim 1, wherein said part of said chamber facing said rotor is an annular groove in said chamber opening towards said rotor.

3. Apparatus according to claim 1, wherein each pipe (6) for the control medium is connected through a three-way valve (21) to a common feed pipe (20) for the control medium, the valve in one position serving as a vent for the control medium.

4. Apparatus according to claim 1, characterized in that several axial conduits (11, 11') of the rotor leading to control members to be actuated by the control medium are each connected with a respective chamber (8) of the stator (2).

* * * * *